Patented Nov. 28, 1944

2,363,499

UNITED STATES PATENT OFFICE 2,363,499

NONAQUEOUS DRILLING FLUID

William E. Campbell, Jr., Taft, Calif., assignor to Standard Oil Company of California, San Francisco, Calif., a corporation of Delaware No Drawing. Application May 5, 1941,
Serial No. 391,959

9 Claims. (Cl. 252—8.5)

The present invention relates to improvements in drilling fluid for oil and gas wells and pertains more particularly to a sedimentation inhibitor for an oil base drilling fluid containing weighting materials.

Nonaqueous drilling fluids are usually prepared in a manner analogous to the preparation of previously used clay-water base muds, that is, by suspending finely divided weighting materials, such as barytes, bentonite, calcium carbonate, iron oxide and the like, in a distilled oil, such as a gas oil or stove oil. In order to obtain suitable sealing and filtering properties of the filter cake that is deposited on the wall of the bore hole, it is also desirable to add a material such as blown asphalt. To prevent settling of the weighting material, particularly at high temperatures at which the viscosity of the oil base decreases, some form of settling or sedimentation inhibitor is usually required.

Heretofore, sedimentation inhibitors, such as lamp black, carbon black, soaps and the like, which are preferentially oil wetted have been added to prevent the settling out of the finely divided weighting materials and to impart additional thixotropic properties to the final product so that it will be adequate to suspend drill cuttings when circulation is temporarily stopped. Some of the principal disadvantages of materials of the type just described are their susceptibility to caking and to the formation of a permanent or irreversible sludge or to decompose upon heating to temperatures of about 200° F., as are commonly encountered in certain deep wells. In addition, those pigment materials, such as lamp black, are extremely disagreeable to handle as they cover all parts of the drilling mechanism, drill pipe, derrick floor and the operators themselves with a black deposit which is exceedingly difficult to remove. Furthermore, the range of viscosities that are obtainable by the use of these materials, the range of densities to which the fluids can be weighted, and the effect of the intrusion of water into the oil base fluids are often undesirable.

This invention comprehends broadly the use of an oil base fluid in which the sedimentation inhibitor is selected from the group of materials which are preferentially water-wettable or have a greater tendency to be wetted by water than by oil, are of a siliceous nature and are also capable of imparting thixotropic properties to a weighted, oil base, drilling fluid. One particular material which has been found to be very desirable is finely divided diatomaceous earth, a natural substance occurring in various parts of the United States and which consists almost entirely of siliceous skeletons of diatoms, and by suitable grinding or similar treatment, may be reduced to small spicular or discoid particles about 2-15 microns in length and having a high specific surface. Preferably, but not necessarily, this material is used in its dried, ground and uncalcined condition. Those organic and inorganic impurities found in some diatomaceous earths do not appear to affect their suitability for the purposes of this invention.

While the exact mechanism by which these materials will impart thixotropic and other desirable properties to oil base fluids of the type described is not completely understood, it appears that this property is related in some manner to the specific surface of the material, this being defined as the ratio of the total surface of an adsorbent to its volume. One method of measuring specific surface of finely divided materials is analogous to that described in the articles by Fowler and Hertel in the Journal of Applied Physics on pages 496–502 of volume 11, 1940, and by Sullivan and Hertel on pages 761–765 of that volume. Generally speaking, it has been found that a material selected from the group mentioned above, and ground or otherwise finely divided to have a specific surface of over about 15,000 sq. cm. per cc., will be found to be suitable, the preferred materials and degree of division, however, having a somewhat higher value of 30,000 to above 40,000 sq. cm. per cc.

Desirably, the mineral oil which is used with this invention is a refined gas oil or stove oil having a gravity of about 34 to 36° A. P. I. The proportions may range from about 30 to 60% of the total mixture.

If an air-blown asphalt is used as a sealing material, its proportions may range from about 8-20%. It is desirable that blown asphalts or equivalent materials be high in asphaltenes, which apparently are relatively insoluble in the oil so that they make a gel or colloidal suspension which acts to make impervious the filter cake or layer formed on the wall of the well bore. Steam-refined asphalts which are relatively more soluble in the oil have been found to be less suitable as a sealing material.

The weighting material preferably is finely divided and may constitute up to 30% of the mixture when it is desired to obtain a density of about 70 to 75 lbs. per cu. ft. For fluids of this density range finely ground calcium carbonate, calcite and bentonite have been found to be satisfactory as weighting agents. Diatomaceous earth itself, which is practically pure silica and therefore has an actual specific gravity of about 2.05 to 2.20, also serves as a weighting agent for low density fluid.

If fluid densities above about 70 lbs. per cu. ft. are desired, barytes, iron oxide or some other material of a high specific gravity which does not add too greatly to the viscosity and gel strength of the fluid may be used. Where higher concentrations of weighting materials are used in the mixture, the proportion of asphalt may be reduced because of the lower oil content of the fluid.

Viscosities of oil base fluids embodying this invention may be varied through the usual ranges found suitable, depending on drilling conditions. The lowest desirable viscosity as measured by the Marsh Funnel Method (500 cc. in and out) has been found to be approximately 40 to 50 seconds at 120° F. At still lower viscosity values difficulties due to settling of the weighting materials may be found at temperatures over 150° F. Filter rates of these fluid mixtures may be reduced substantially to zero, which is a valuable property when it is desired to conserve the loss of oil from the base fluid to the formations under the high pressure differentials sometimes encountered in deep wells.

The effect of water which may intrude into an oil base fluid of this kind depends somewhat on the nature of the suspended solids in the fluid. Brines or fresh water have been found to increase the viscosity, probably because of the formation of water-in-oil emulsions of varying stability and degree of dispersion. The effect of water upon the viscosity also depends upon the degree of agitation to which the mixture is subjected. Where diatomaceous earth is used as the sedimentation inhibitor and a carbonate, such as calcium carbonate or calcite, is used as the weighting material, moderate amounts of brines may be tolerated in the drilling fluid without damaging its desirable properties.

The amount of sedimentation inhibitor obviously varies according to the type of material used. For diatomaceous earth the proportion may range from 3 to 20%, but the preferred range is generally from 6 to 10%. If bentonite of suitable specific surface characteristics is used as the weighting agent, the proportion of diatomaceous earth may be lowered due to the inherent property of such a form of bentonite to inhibit settling of its own particles and those of foreign materials picked up from the formation.

Oil base fluids containing diatomaceous earth or the other materials disclosed above as sedimentation inhibitors have been found to be markedly thixotropic, i. e., their viscosity decreases at increased rates of shear. Directly after vigorous rates of agitation, the shear strength of a suitable mixture, as measured by a shearometer, may have a value of zero pounds per square foot; and after standing for only a few minutes, the mixture sets to a soft gel having a shear strength of 0.2 or more pounds per square foot. This property has been found to be of great value for suspending cuttings in a well bore when circulation of the drill fluid is stopped, as it must be at intervals during drilling of a deep well.

In conclusion, it is considered that a principal feature of this invention is the inclusion in a weighted, oil base or nonaqueous drilling fluid of a sedimentation inhibitor selected from the group consisting of preferentially water-wettable siliceous solid materials capable of imparting thixotropic properties to the fluid and desirably having a specific surface of over 15,000 sq. cm. per cc. and preferably greater than 30,000 to 40,000 sq. cm. per cc. Although specific proportions and materials have been given in the foregoing description, it is obvious that other proportions and materials may be found to be desirable for specific conditions and all such that may come within the scope of the appended claims are embraced thereby.

I claim:

1. A nonaqueous drilling fluid comprising a mineral oil base, a finely powdered weighting material, and a finely divided sedimentation inhibitor for said weighting material selected from the group consisting of preferentially water-wettable siliceous materials and capable of imparting thioxotropic properties to said fluid, said sedimentation inhibitor having a specific surface of over 15,000 sq. cm. per cc.

2. A drilling fluid according to claim 1 in which said sedimentation inhibitor has a specific surface of over 15,000 sq. cm. per cc. and preferably greater than 30,000 to 40,000 sq. cm. per cc.

3. A sedimentation inhibitor for nonaqueous mineral oil base drilling fluids comprising diatomaceous earth which has been treated to have a specific surface of over 15,000 sq. cm. per cc.

4. A sedimentation inhibitor for a nonaqueous mineral oil base drilling fluid comprising a siliceous material which has been treated to have a specific surface of over 15,000 sq. cm. per cc. and preferably greater than 30,000 to 40,000 sq. cm. per cc.

5. A nonaqueous drilling fluid comprising a mineral oil, a finely powdered weighting material and diatomaceous earth.

6. A drilling fluid according to claim 5 in which said weighting material is calcium carbonate.

7. A drilling fluid according to claim 5 in which said weighting material is barytes.

8. A drilling fluid according to claim 5 in which said weighting material is bentonite.

9. In drilling oil and gas wells, the step of circulating in the bore hole a nonaqueous mineral oil base drilling fluid comprising a finely divided solid weighting material, a wall sealing material containing an effective amount of asphaltenes substantially to prevent oil loss from said bore hole to the formation through which it is drilled, and a finely divided sedimentation inhibitor selected from the group consisting of preferentially water-wettable siliceous solid materials having a specific surface of over 15,000 sq. cm. per cc. and preferably greater than 30,000 to 40,000 sq. cm. per cc.

WILLIAM E. CAMPBELL, Jr.